(12) United States Patent
Ko et al.

(10) Patent No.: US 12,327,397 B2
(45) Date of Patent: Jun. 10, 2025

(54) ELECTRONIC DEVICE AND METHOD WITH MACHINE LEARNING TRAINING

(71) Applicant: Samsung Electronics Co., Ltd., Suwon-si (KR)

(72) Inventors: Minsu Ko, Suwon-si (KR); Sungjoo Suh, Seongnam-si (KR); Huijin Lee, Pohang-si (KR); Eunju Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 17/978,672

(22) Filed: Nov. 1, 2022

(65) Prior Publication Data

US 2023/0134508 A1    May 4, 2023

(30) Foreign Application Priority Data

Nov. 4, 2021   (KR) .................. 10-2021-0150686
Feb. 25, 2022  (KR) .................. 10-2022-0025387

(51) Int. Cl.
*G06V 10/00*      (2022.01)
*G06T 7/00*       (2017.01)
(Continued)

(52) U.S. Cl.
CPC .......... *G06V 10/774* (2022.01); *G06T 7/0004* (2013.01); *G06V 10/7715* (2022.01);
(Continued)

(58) Field of Classification Search
CPC .. G06V 10/774; G06V 10/7715; G06V 10/82; G06T 7/0004; G06T 2207/20081; G06T 2207/20084
See application file for complete search history.

(56) References Cited

U.S. PATENT DOCUMENTS

2014/0148244 A1   5/2014  Souza et al.
2018/0108139 A1*  4/2018  Abramoff .............. G06N 3/045
(Continued)

OTHER PUBLICATIONS

Hah, Junghoon, et al. "Information-based boundary equilibrium generative adversarial networks with interpretable representation learning." *Computational Intelligence and Neuroscience* 2018 (2018). pp. 1-15.
(Continued)

*Primary Examiner* — Ping Y Hsieh
(74) *Attorney, Agent, or Firm* — NSIP Law

(57) ABSTRACT

Training of a machine learning model is included. An electronic device includes a memory storing a machine learning model including a discriminator model, and a processor configured to extract, from a training image, a first image patch and a second image patch at least partially overlapping the first image patch, extract, from the first image patch, a first feature map based on a layer of the discriminator model, extract, from the second image patch, a second feature map based on the layer, extract a first partial feature map from a projected map that is projected based on the first feature map, and train the discriminator model based on a first objective function value generated based on a second partial feature map and the first partial feature map, wherein the second partial feature map corresponds to a part of the extracted second feature map.

23 Claims, 11 Drawing Sheets

(51) Int. Cl.
  *G06V 10/77* (2022.01)
  *G06V 10/774* (2022.01)
  *G06V 10/82* (2022.01)
(52) U.S. Cl.
  CPC .... *G06V 10/82* (2022.01); *G06T 2207/20081* (2013.01); *G06T 2207/20084* (2013.01)

(56) References Cited

U.S. PATENT DOCUMENTS

| | | |
|---|---|---|
| 2018/0300880 A1* | 10/2018 | Fan ............... G06V 20/582 |
| 2019/0147320 A1* | 5/2019 | Mattyus ........... G06V 20/182 |
| | | 382/155 |
| 2020/0065968 A1* | 2/2020 | Sargent ............. G06V 10/82 |
| 2020/0265219 A1 | 8/2020 | Liu et al. |
| 2021/0042583 A1 | 2/2021 | Ghaffarzadegan et al. |

OTHER PUBLICATIONS

Chen, Xi, et al. "Infogan: Interpretable representation learning by information maximizing generative adversarial nets." *Advances in neural information processing systems* vol. 29 (2016). pp. 1-14.

O Pinheiro, Pedro O., et al. "Unsupervised learning of dense visual representations." *Advances in Neural Information Processing Systems* vol. 33 (2020). pp. 1-14.

Jeong, Jongheon, et al. "Training GANs with stronger augmentations via contrastive discriminator." arXiv preprint arXiv:2103.09742 (2021). pp. 1-23.

Ko, Minsu, et al. "Self-Supervised Dense Consistency Regularization for Image-to-Image Translation." *Proceedings of the IEEE/CVF Conference on Computer Vision and Pattern Recognition.* (2022). pp. 1-10.

* cited by examiner

ELECTRONIC DEVICE AND METHOD WITH MACHINE LEARNING TRAINING

CROSS-REFERENCE TO RELATED APPLICATIONS

This application claims the benefit under 35 USC § 119(a) of Korean Patent Application No. 10-2021-0150686 filed on Nov. 4, 2021, and Korean Patent Application No. 10-2022-0025387 filed on Feb. 25, 2022, in the Korean Intellectual Property Office, the entire disclosures of which are incorporated herein by reference for all purposes.

BACKGROUND

1. Field

The following description relates to training of a machine learning model.

2. Description of Related Art

To solve problems of classifying input patterns into specific groups, artificial neural networks provide a learning ability. For example, an artificial neural network may infer a mapping between input patterns and output patterns, and may have a generalized ability to generate relatively correct outputs, even for input patterns that are not used for learning. A neural network may also be trained by reinforcement learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a memory storing a machine learning model including a discriminator model, and a processor configured to extract, from a training image, a first image patch and a second image patch at least partially overlapping the first image patch, extract, from the first image patch, a first feature map based on a layer of the discriminator model, extract, from the second image patch, a second feature map based on the layer, extract a first partial feature map from a projected map that is projected based on the first feature map, and train the discriminator model based on a first objective function value generated based on a second partial feature map and the first partial feature map, wherein the second partial feature map corresponds to a part of the extracted second feature map.

The processor may be further may be configured to determine, to be the first partial feature map, a portion of the projected map corresponding to an overlapping region between the first image patch and the second image patch, and determine, to be the second partial feature map, a portion of the second feature map corresponding to the overlapping region.

The processor may be further may be configured to update a parameter of the layer, or another layer, of the discriminator model, and update a parameter of the projector model, based on the first objective function value.

The memory may be configured to further store a generator model connected with an input of the discriminator model in the machine learning model, and wherein the processor may be further may be configured to calculate a second objective function value based on target discrimination data and source discrimination data, wherein the target discrimination data may be calculated by using the discriminator model from the training sample image, and wherein the source discrimination data may be calculated based on the discriminator model from a fake image generated by using the generator model.

The processor may be further may be configured to train the generator model through a third objective function value based on the source discrimination data calculated based on the discriminator model from the fake image generated by using the generator model.

The processor may be further may be configured to output a discrimination result for an input image, based on at least one of the discriminator model and a generator model trained by using the discriminator model.

The processor may be further may be configured to generate, from the discriminator model, discrimination data having a discrimination probability value for each pixel of the input image, and determine the discrimination result based on the discrimination probability value or a region discriminated based on the discrimination probability value in the discrimination data.

The processor may be further may be configured to output, from a product image input to the machine learning model, an indication of whether a product represented in the product image may be normal or abnormal, based on the discriminator model or the generator model trained by using the discriminator model.

The processor may be further may be configured to output a feature map on which a value of a portion to be discriminated may be higher than a value of a remaining portion, from the layer of the discriminator model.

The processor may be further configured to: extract new image patches partially overlapping with each other from respective images of a training data set, based on a demand for an update of the discriminator model; and update a parameter of the discriminator model by using an objective function value calculated based on the extracted new image patches.

The first feature map may be generated by the layer of the discriminator model, and wherein the second feature map may be generated by the layer.

The layer may be a convolution layer may further include weights.

The projected map may be generated by a projection model based on the first feature map.

A training method performed by an electronic device, the method may include extracting, from an image, a first image patch and a second image patch at least partially overlapping the first image patch, extracting, from the first image patch, a first feature map based on a layer of a discriminator model of a machine learning model, extracting, from the second image patch, a second feature map based on the layer, extracting, from the first feature map, a first partial feature map corresponding to a part of a projected map projected from first partial feature map, and training the discriminator model based on a first objective function value calculated based on a second partial feature map and the first partial feature map, wherein the second partial feature map corresponds to a part of the second feature map.

The extracting of the first partial feature map may include determining, to be the first partial feature map, a portion of the projected map corresponding to an overlapping region between the first image patch and the second image patch, and wherein the training of the discriminator model may include determining a portion corresponding to the overlapping region on the extracted second feature map, to be the second partial feature map.

The training of the discriminator model may include updating a parameter of at least the layer, or another layer, of the discriminator model and a parameter of the projector model, based on the first objective function value.

The training of the discriminator model may include calculating a second objective function value based on target discrimination data and source discrimination data, wherein the target discrimination data may be calculated by using the discriminator model from the image, and the source discrimination data may be calculated based on the discriminator model from a fake image generated by a generator model in the machine learning model.

The method may further include training the generator model through a third objective function value based on the source discrimination data calculated based on the discriminator model from the fake image generated by using the generator model.

The method may further include outputting a discrimination result for an input image based on the discriminator model or a generator model trained by the discriminator model.

The outputting the discrimination result may include generating, from the discriminator model, discrimination data having a discrimination probability value for each pixel of the image; and determining the discrimination result based on the discrimination probability value and a region discriminated based on the discrimination probability value in the discrimination data.

The outputting of the discrimination result may include outputting, from a product image input to the machine learning model, whether a product comprised in the product image may be normal or abnormal, based on the discriminator model or a generator model trained by using the discriminator model.

The method may further include outputting a feature map on which a value of a portion to be discriminated is higher than a value of a remaining portion, in the layer of the discriminator model.

In one general aspect, a method is performed by an electronic device that includes processing hardware, the method includes: extracting a first sub-region and a second sub-region from an image, wherein a portion of the image corresponds to an overlap between the first sub-region and the second sub-region; generating a first feature map based on weights of a convolution layer and the first sub-region; generating a second feature map based on the weights of the first convolution layer and the second sub-region, the second feature map comprising a first sub-map that is a portion of the second feature map corresponding to the portion of the image; generating a third feature map based on the first feature map, the third feature map comprising a second sub-map portion that is a portion of the third feature map corresponding to the portion of the image; training the weights based on the first sub-map and the second sub-map.

The method may further include generating a loss based on the first sub-map and the second sub-map, wherein the training is based on the loss.

The third feature map may be based on another convolution layer that may be applied to the first feature map.

The method may further include enlarging the first sub-region and the second sub-region before generating the first and second feature maps therefrom.

The layer may include a layer of a discriminator model that may be part of a GAN model.

The method may further include updating a generator model that may be part of the GAN model based on a loss obtained from a discrimination output outputted by the discriminator model after the training of the weights.

A non-transitory computer-readable storage medium may store instructions that, when executed by a processor, cause the processor to perform any of the methods.

Other features and aspects will be apparent from the following detailed description, the drawings, and the claims.

BRIEF DESCRIPTION OF THE DRAWINGS

FIG. 3 illustrates an example of training a discriminator model, according to one or more embodiments.

Figure 1:
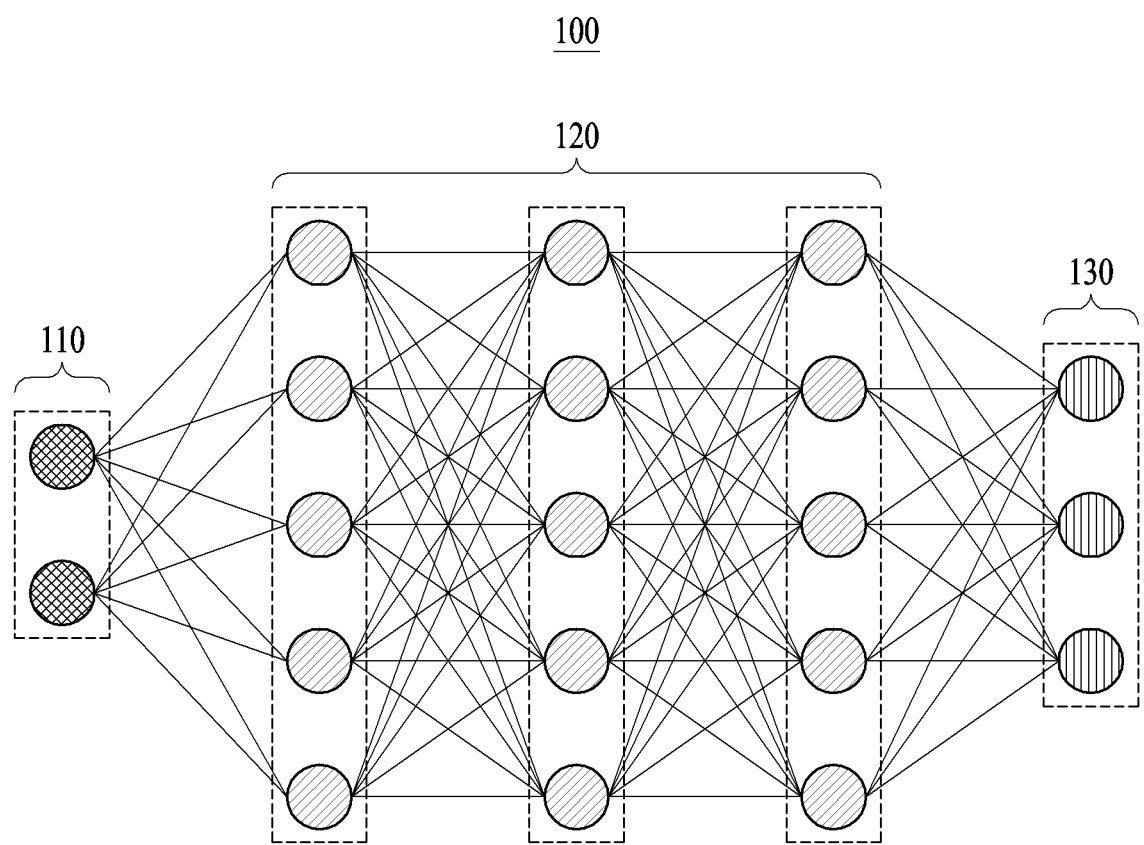
FIG. 1 illustrates an example of a machine learning model, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a machine learning model, according to one or more embodiments.

An electronic device according to an example may train one or more machine learning models and perform an inference (e.g., a discrimination) by using a trained machine learning model. The discrimination may indicate an operation of determining true or false for data that is input to the machine learning model. The machine learning model may include, for example, a neural network 100.

A neural network 100 may be an example of a deep neural network (DNN). The DNN may be a fully connected network, a deep convolutional network, a recurrent neural network, a generative adversarial network (GAN), or the like. In the present disclosure, an example of a GAN model is mainly described. The neural network 100 may perform various operations (e.g., robot control based on sensed surrounding information) by mapping input data and output data that have a non-linear relationship therebetween based on deep learning. The input data and the output data may be mapped to each other based on supervised learning or unsupervised learning (e.g., reinforcement learning).

Referring to FIG. 1, the neural network 100 may include an input layer 110, a hidden layer 120, and an output layer 130. Each of the input layer 110, the hidden layer(s) 120 and the output layer 130 may each include a respective plurality of artificial nodes.

Although for ease of description FIG. 1 illustrates the hidden layer 120 with three layers, the hidden layer 120 may include various numbers of layers. Furthermore, FIG. 1 illustrates the neural network 100 including a separate input layer for receiving input data, however the input data may be provided directly input to the hidden layer 120. The artificial nodes of layers other than the output layer 130 in the neural network 100 may be connected to artificial nodes of a subsequent layer through links for transmitting output signals (e.g., activations). In some cases, the number of links from a layer may correspond to the number of artificial nodes included in the subsequent layer (and may respectively connect thereto).

An output of an activation function of a given node at a given layer (which may be based on weighted inputs of artificial nodes included in a previous layer) may be provided as input to one or more, or each, artificial nodes included in the next layer. The weighted inputs may be obtained by multiplying inputs of the artificial nodes included in the previous layer by respective weights. A weight may be referred to as a parameter of the neural network 100. The activation function may include a sigmoid, a hyperbolic tangent (tanh), and a rectified linear unit (ReLU), for example, and a non-linearity may be formed in the neural network 100 by the activation function. The weighted inputs of the artificial nodes included in the previous layer may be input to each artificial node included in the output layer 130. In some cases, each node in one layer may not be linked to each node in a next layer.

The neural network 100 may have enough capacity to implement an arbitrary function if a width and a depth of the neural network 100 are sufficient. When the neural network 100 learns a sufficient amount of training data through an appropriate training process, the neural network 100 may achieve a determined optimal or acceptable recognition performance.

Although the neural network 100 is described as an example of the machine learning model above, the machine learning model is not limited to the neural network 100 and may be embodied to have various structures. An electronic device may train the machine learning model, which may include a discriminator model. In the present disclosure, mostly, for explanator purposes, GAN models including a generator model and a discriminator model are mainly described as an example of the machine learning model. The electronic device may train the generator model by using a trained discriminator model and/or may perform an inference operation (e.g., a discrimination) by using the discriminator model and/or the generator model.

The generator model may generate an image from source data. The source data may be data (e.g., a latent vector) sampled from, for example, a source image or a source latent space. The discriminator model may output discrimination data related to whether an image (e.g., a fake/artificial image) generated by the generator model is similar to a real image. The discrimination data may represent whether an object of an image input to the discriminator model is true or false, and may include a probability map indicating, for example, a probability value that an object included in the image is true (or a probability value that the object is false), or a probability value that each pixel of the image belongs to a true object (or probability value that the corresponding pixel belongs to a false object and/or a background). The generator model may be a function that generates an output image that is similar to an image of a target domain from data (e.g., the latent vector or image) of a source domain. The discriminator model may output discrimination data that determines a similarity between an output of the generator model and the target domain. Learning of the generator model may be guided by the discrimination data. The generator model may be trained based on an adversarial loss. The generator model may be trained such that the discriminator model is unable to accurately discriminate true or false, that is, the well-trained generator model may output an image similar enough to a real image to deceive the discriminator model. The electronic device may train the machine learning model by using training data having positive pairs and/or a negative pairs.

The electronic device according to an example may perform representation learning based on self-supervised learning for regularization of the discriminator model. Even though a label of an image is not given, the electronic device may perform training of a visual representation of the machine learning model from an input image. The electronic device may proceed with learning without data of a target task (e.g., the training data may be unlabeled). The trained machine learning model may be applied to a downstream task, such as image classification. For example, the generator model and the discriminator model of the GAN model may be variously configured to predict at the pixel level. An image generation task and a translation task between images may be a pixel level prediction task. The machine learning model according to an example may be configured to be capable of processing a representation of the pixel level. The machine learning model may be applied to tasks including an image segmentation and an object detection, as well as image classification. In other words, the electronic device according to an example may provide accurate image translation and image discrimination by using the GAN model based on a dense representation.

In some embodiments regularization for the GAN model may acquire a representation that readily discriminates between a real image and a generated image. The electronic device according to an example may train the discriminator model to discriminate a local visual detail, and train the generator model to output an image that expresses local visual detail. For example, the electronic device may train the discriminator model of the GAN model based on a dense consistency regularization (DCR). A DCR loss may be a loss of consistency for each pixel between a pair of image patches cropped from the same image. The electronic device may improve the quality of image generation through a pixel-level prediction and a dense regularization of representation. The generator model trained based on the discriminator model trained by DCR may generate an image that is consistent spatially, semantically, or visually. A dense correspondence regularization according to an example may be applied to an intermediate layer of the discriminator model.

The discriminator model based on DCR, according to an example, may represent the generated mage with a reduced calculation cost and improved quality, compared, for example, to a gradient-based regularization technique. Furthermore, the discriminator model based on DCR according to an example may have improved spatial sensitivity and accuracy, compared, for example, to an implementation that uses contrast level learning. Distribution of the target domain may be accurately reflected in the discriminator representation processed by the discriminator model based on DCR. Therefore, the generator model trained by using the discriminator model based on the DCR may generate a high-quality image in an image-to-image translation.

Figure 2:
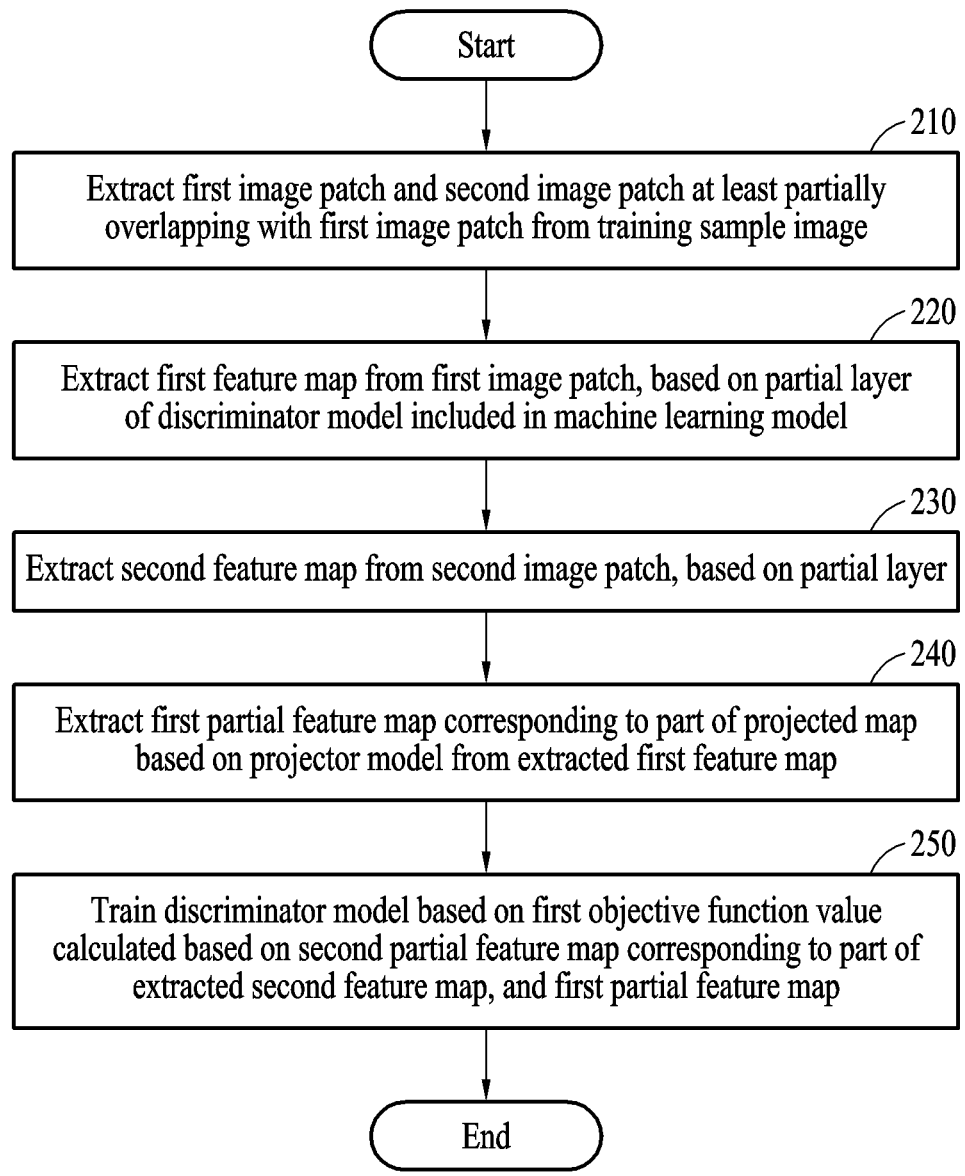
Figure 3:
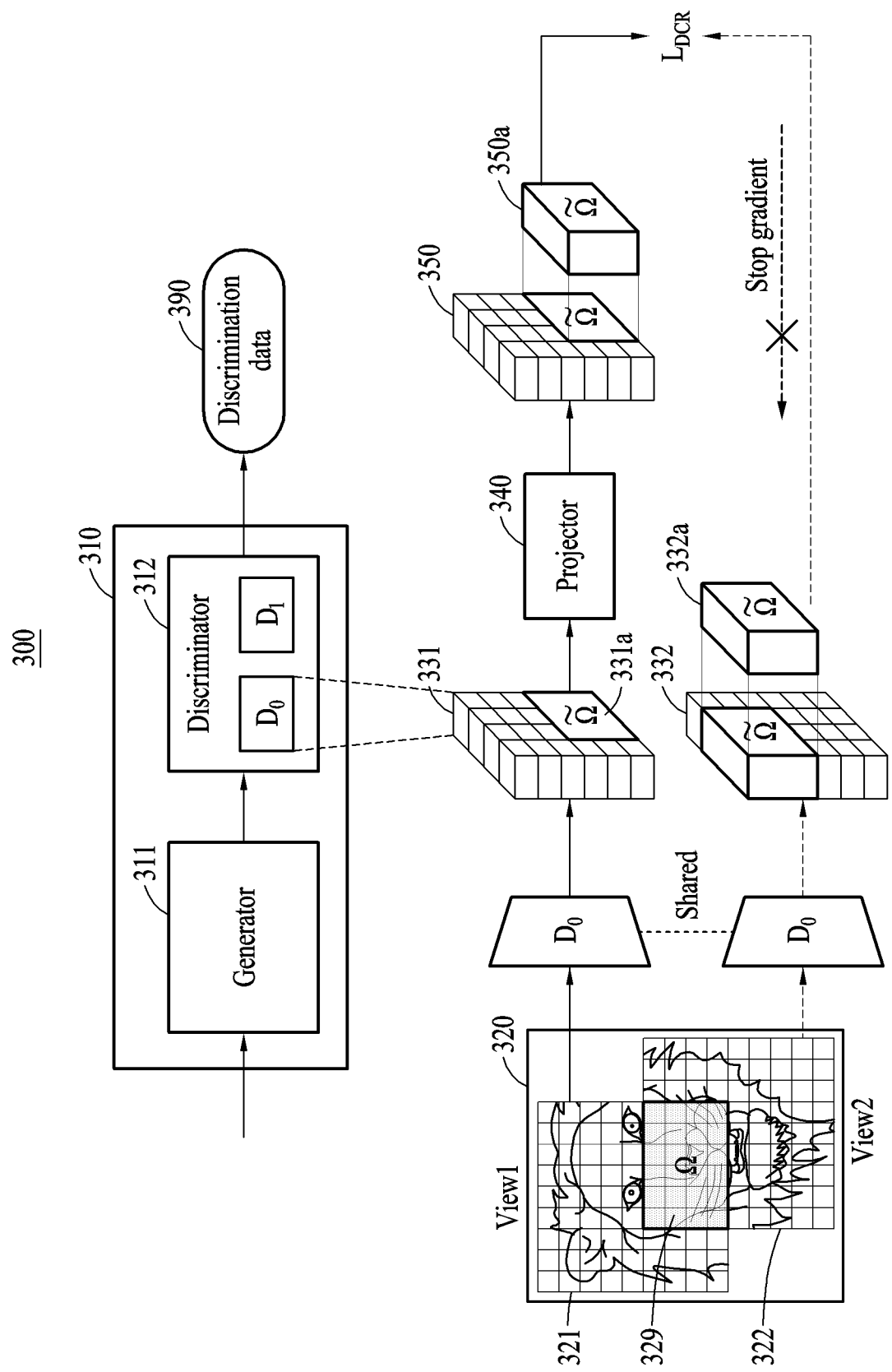
FIG. 3 illustrates an example of training of a discriminator model, according to one or more embodiments.

FIGS. 2 and 3 illustrate examples of training of a discriminator mode, according to one or more embodiments.

A machine learning model 300 according to an example may include a GAN model 310 that includes a generator model 311 and a discriminator model 312. An electronic device may output discrimination data 390 based on the discriminator model 312 according to input data (e.g., an input image) generated by the generator model 311. The discriminator model 312 may include a partial layer D0 and another layer D1. A feature map that is output by the partial layer D0 may include an intermediate level local feature and a spatial component. The electronic device may calculate DCR loss (LDCR) by using the partial layer D0 of the discriminator model 312, and perform training according to the LDCR. The calculation of LDCR and the training will be described below.

First, in operation 210, a processor of the electronic device may extract a first image patch 321 and a second image patch 322 at least partially overlapping with the first image patch 321, from a training sample image 320. The training sample image may belong to a source domain, and may be a sampled image for training. In FIG. 3, the training sample image is an image of a tiger, which serves as an example of an object. As illustrated in FIG. 3, the first image patch 321 and the second image patch 322 may have a region (hereinafter, an overlapping region 329) of partial overlap. For example, the electronic device may extract, as an image patch, an area having a same aspect ratio as the training sample image and having an area exceeding a quarter of the area of the training sample image. In this case, even when the image patches are extracted from the training sample image for partially arbitrary areas (i.e., constrained as noted but otherwise random), at least a part of the image patches may overlap each other (i.e., the image patches overlap but may be partly disjoint). The overlapping region 329 may include a view, contents, and/or a scene that are common from the training sample image. For reference, the electronic device may individually re-size the first image patch 321 and the second image patch 322 to have the same size as the size of the training sample image, and then input the resized first image patch 321 and the resized second image patch 322 to the discriminator model 312. Also, as described later, a size and a resolution of the image generated by the generator model 311 may have the same size (dimension) of the image input to the discriminator model 312.

In operation 220, the electronic device may extract a first feature map 331 from the first image patch 321 using the partial layer $D_0$ of the discriminator model 312 included in the machine learning model 300. The electronic device may extract the first feature map 331 by propagating the first image patch 321 through the partial layer $D_0$. The first feature map 331 may be data that represents a visual feature abstracted from the first image patch 321 by the partial layer $D_0$. The first feature map 331 may include a portion 331a (e.g., $\tilde{\Omega}$) corresponding to the overlapping region 329 between the image patches. The partial layer $D_0$ may be "partial" in that it may be or include, for example, only some layer(s) of the discriminator model 312 or a portion of such layer(s) that are used to extract the first feature map 331.

In operation 230, the electronic device may extract a second feature map 332 from the second image patch 322 using the partial layer $D_0$. The electronic device may extract the second feature map 332 by propagating the second image patch 322 through the partial layer $D_0$. The second feature map 332 may be data that represents a visual feature abstracted from the second image patch 322 by the partial layer $D_0$. The second feature map 332 may include a portion 332a (e.g., $\tilde{\Omega}$) corresponding to the overlapping region 329 between the image patches. For reference, although FIG. 3 illustrates that the partial layer $D_0$, to which the first image patch 321 is input, and the partial layer $D_0$, to which the second image patch 322 is input, are separate layers and have the same parameter (e.g., the same connection weight), there is no limitation thereto. That is to say, for extracting the first and second feature maps in parallel, for example, there may be two partial layers with the same weights. Alternatively, the electronic device may apply the same partial layer $D_0$ to the first image patch 321 and to the second image patch 322.

In operation 240, the electronic device may extract a first partial feature map 350a corresponding to a part (e.g., $\tilde{\Omega}$) of a projected map 350 projected from the extracted first feature map 331 based on a projector model 340. For example, the electronic device may determine the portion 331a corresponding to the overlapping region 329 between the first image patch 321 and the second image patch 322 on the projected map 350, on which the first feature map 331 is projected, to be the first partial feature map 350a. The first partial feature map 350a may be a map that represents a visual feature abstracted and projected from the overlapping region 329 described above. The projector model 340 may be a model that outputs a result of projecting input data, and may output a feature map that has the same size (e.g., W×H×C, here, W denotes a width of the input feature map, H denotes a height of the feature map, and C denotes the number of channels) as the size of the input feature map, which may help for maintaining spatial information. The feature map output by the projector model 340 will be referred to as the projected map 350. The projector model 340 may include, for example, one or more convolutional layers. The convolutional layer(s) may be connected through an activation layer (e.g., a Leaky Rectified Linear Unit (LeakyReLU) activation function). However, the projector model 340 is not limited thereto, and the number, size and shape of the convolutional layers and the kernels thereof may vary depending on a design.

In operation 250, the electronic device may train the discriminator model 312 based on a first objective function value calculated based on a second partial feature map 332a and the first partial feature map 350a. The second partial feature map 332a may correspond to (or may be be) a part of the extracted second feature map 332. The electronic device may update a parameter of at least the partial layer Do of the discriminator model 312 and a parameter of the projector model 340, based on the first objective function value. For example, the electronic device may determine the second partial feature map 332a to be a portion of the second feature map 332 that corresponds to the overlapping region 329.

The electronic device may calculate the first objective function value based on the first partial feature map 350a and the second partial feature map 332a. As illustrated in FIG. 3, the first objective function value may be DCR loss (LDCR). The LDCR may be a loss function that is designed such that the partial feature maps corresponding to the overlapping region 329 become more similar to each other. The electronic device may update, for example, a parameter (e.g., a connection weight) of the discriminator model 312 until the LDCR sufficiently converges. In this case, the electronic device may use a stop gradient technique to prevent convergence from collapsing into a trivial solution. The LDCR may be represented as shown in Equation 1 below.

$$\mathcal{L}_{DCR}=\tfrac{1}{2}\mathrm{sim}_{nc}(r_1,F_{sg}(z_2))+\tfrac{1}{2}\mathrm{sim}_{nc}(r_2,F_{sg}(z_1)) \quad \text{Equation 1}$$

In Equation 1, $F_{sg}(\ )$ may be a function in which a stop gradient layer is modeled. $F_{sg}(z2)$ may be $z_2$ fixed from a back propagation to a constant number, and $F_{sg}(z_1)$ may be $z_1$ fixed from a back propagation to a constant number. In Equation 2 below, $\mathrm{sim}_{nc}(\ )$ for $r_1$ and $z_2$ is described, and may be similarly applied for $r_2$ and $z_1$. For reference, in Equation 1 above, $F_{sg}(\ )$ represents a command to block the back propagation, and $F_{sg}(z_2)$ may be calculated as $z_2$ as shown in Equation 2 below.

$$sim_{nc}(r_1, z_2; \tilde{\Omega}) = \sum_{j\in\tilde{\Omega}} -\frac{r_1}{\|r_1\|_2} \cdot \frac{z_2}{\|z_2\|_2} \quad \text{Equation 2}$$

Referring to Equation 2, the LDCR may be calculated by Equation 1 by using two local features $D0(x_1)$ and $D0(x_2)$. In Equation 2, $\tilde{\Omega}$ represents a feature correspondence, and $\|\cdot\|_2$ represents L2-norm. In other words, Equation 2 represents a similarity (e.g., a negative cosine similarity) between the first partial feature map 350a (e.g., $r_1$) and the second partial feature map 332a (e.g., $z_2$) for the overlapping region 329. In this example, $r_1:=R(D0(x_1))$ and $z_2:=D0(x_2)$. Variable $x_1$ represents the first image patch 321, and $x_2$ represents the second image patch 322. $D0(\ )$ represents a function in which the partial layer of the discriminator model 312 is modeled, and $R(\ )$ represents a function in which the projector model 340 is modeled.

For reference, in order to calculate $\mathrm{sim}_{nc}(\ )$ a positive feature pair with pixel correspondence may be selected from every feature value pair of two local features (e.g., the first feature map 331 extracted from the first image patch 321 and the second feature map 332 extracted from the second image patch 322). Each pixel of the feature maps is warped into an original image space, and distances between every respective pixel pair in the two feature maps may be calculated. Based on the distances between the pixel pairs, pixels belonging to the overlapping region 329 on each feature map may be determined. Accordingly, the electronic device may acquire the first partial feature map 350a and the second partial feature map 332a by extracting the pixels determined to belong to the overlapping region 329.

The discriminator model 312 according to an example may capture a local context of an output image in order to increase fidelity for the target domain in an image-to-image translation scenario. The discriminator model 312 may have an ability (e.g., a spatial sensitivity) to identify spatially close pixels to accurately predict a boundary region in which a label changes for the pixels therein. The boundary region in which a label changes may be, for example, a region corresponding to a boundary between a region having an object and a region having a background (or other non-object image data). As described later with reference to FIG. 6B, the generator model 311 trained by using the discriminator model 312 described above may generate an image of which a style (e.g., a texture) changes, while maintaining a visual appearance (e.g., a shape) of the source image belonging to the source domain.

Figure 4:
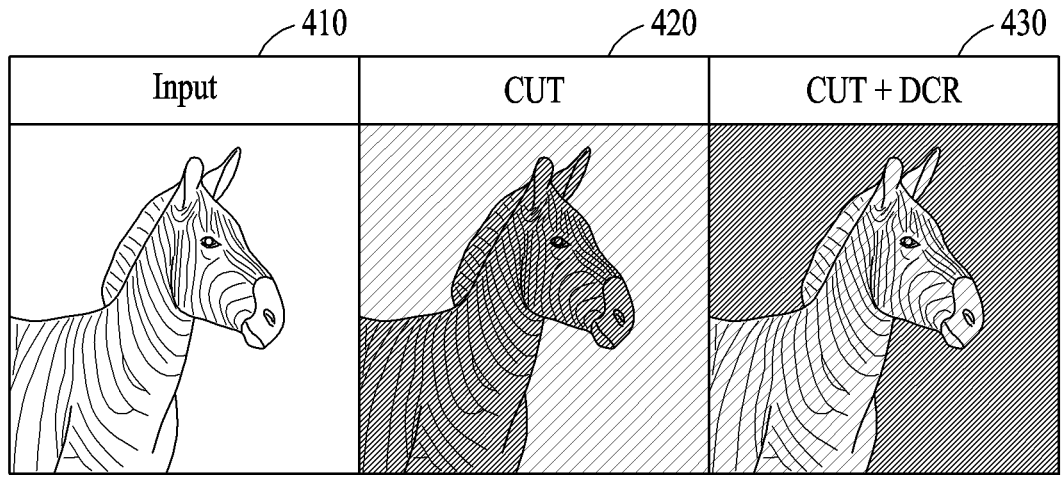
FIG. 4 visually an example of an active level of a feature map extracted from a part of a discriminator model, according to one or more embodiments.

FIG. 4 visually illustrates an example of an active level of a feature map extracted from a part of a discriminator model, according to one or more embodiments.

As a magnitude of each element value (e.g., a feature value) of a feature map increases, an active level may be interpreted as being high, and as a magnitude of a feature value decreases, an active level may be interpreted as being low. A small feature value may be more likely to be ignored (in a discrimination operation by a discriminator model) than a large feature value. In FIG. 4, a high active level is illustrated as bright, and a low active level is illustrated as dark.

A feature map 420 extracted from an intermediate layer from an input image 410 of a discriminator model according to a comparative example (e.g., a contrastive unpaired translation (CUT)) may represent a high active level at a portion corresponding to a background (or other non-object image data) rather than a portion corresponding to an object. In contrast, an electronic device according to an example (e.g., CUT+DCR) may output, from a partial layer (e.g., D0) of the discriminator model, a feature map 430 for which a value of a portion to be discriminated (e.g., the portion corresponding to the object) is higher than a value of the remaining portion (e.g., the portion corresponding to the background/non-object). The feature map 430 extracted by the partial layer of the discriminator model trained based on the DCR may represent a high active level at the portion corresponding to the object. Accordingly, the electronic device according to an example may output discrimination data focused on (e.g., identifying or isolating) the object (e.g., an object having a texture, such as a pattern) through the discriminator model based on the DCR.

Figure 5:
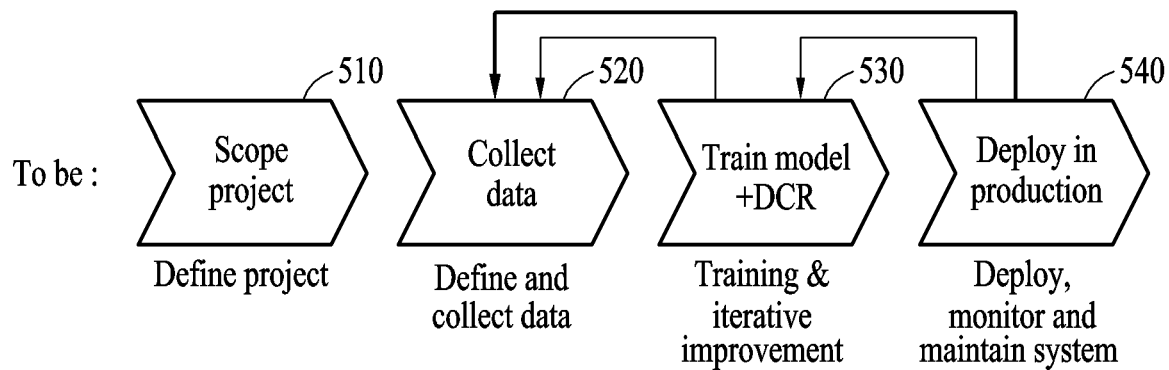
FIG. 5 illustrates an example of a design, a training, and a management of a system using a machine learning model, according to one or more embodiments.

FIG. 5 illustrates an example of a design, a training, and a management of a system using a machine learning model, according to one or more embodiments.

According to an example, in operation 510, a scope of a project may be defined. A project may be set according to a target task. The target task may be, for example, utilizing a discrimination of a normal product based on a vision recognition, generation of an artificial image, image-to-image translation, translation from data in a source domain into data in a target domain, and a GAN model, in a process (e.g., a production line) of manufacturing a product. Utilizing a GAN model may include, for example, image synthesis and image editing based on a generator model of the GAN model, which may be performed in the electronic device (e.g., a mobile terminal, such as a smartphone). For reference, the product may be, for example, a glass substrate (e.g., a mask) on which is drawn a fine electronic circuit used in a photolithography process for manufacturing a semiconductor integrated circuit, a wafer, dynamic random access memory (DRAM), negative-AND (NAND) flash, or the like. Furthermore, the product may be not only a finished product of the semiconductor, but also an intermediate component used in a process of manufacturing a semiconductor. Although the present disclosure describes a product image including an entire wafer, there is no limitation thereto, and the product image may be an image of a circuit pattern indicating a semiconductor circuit printed on the wafer.

In operation 520, training data for the target task may be collected. The training data may include an image for the target task. For example, in a process of manufacturing a product, the training data for discriminating a normal product may be images of examples of the normal product. As another example, training data for image-to-image translation may include a source image (e.g., an image including an object before translation) in a source domain, and a target image (e.g., an image including an object after translation) in a target domain. As described later, image-to-image translation may be an operation of translating a texture while maintaining a shape, for example, translating an image including a horse into an image including a zebra, translating an image including a dog into an image including a cheetah, and so forth.

In operation 530, the electronic device may train a machine learning model (e.g., the GAN model) based on a DCR. The electronic device may iteratively update a parameter of the discriminator model, based on a DCR loss. The electronic device may train a generator model of the GAN model by iteratively updating a parameter of the generator model by using the discriminator model. Examples of updating the discriminator model and the generator model will be described with reference to FIGS. 6A through 7. For example, the electronic device may perform training by using the training sample image sampled from the training data collected in operation 520 described above. When the electronic device determines that a re-training is necessary, the electronic device may collect new training data in operation 520, and re-train the machine learning model by using the newly collected training data in operation 530. The re-training of the machine learning model is described with reference to FIG. 10.

In operation 540, the electronic device may employ a trained machine learning model with respect to a product. For example, the electronic device may output a discrimination result indicating whether a product produced is normal by using the generator model and/or the discriminator model of the GAN model designed and trained for discriminating a normal product in a process of manufacturing the product. The electronic device may maintain or control a system that uses the machine learning model, while monitoring the discrimination result. For example, when the electronic device determines that the re-training is necessary, the electronic device may perform the re-training according to operations 520 and 530.

Figure 6A:
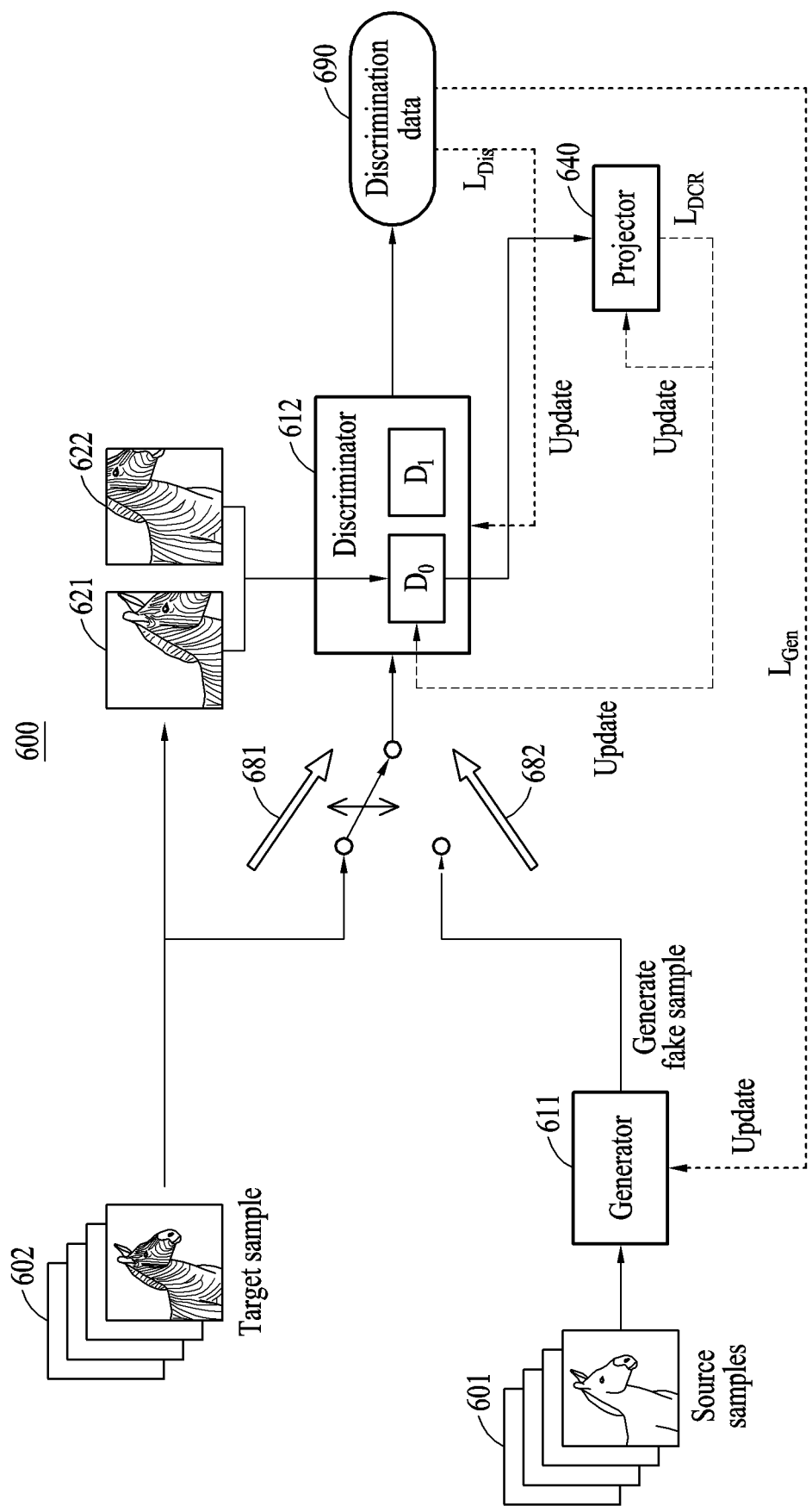
FIG. 6A illustrates an example of training a machine learning model, according to one or more embodiments.
Figure 6B:
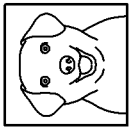
FIG. 6B illustrates examples of generated images, according to one or more embodiments.
Figure 7:
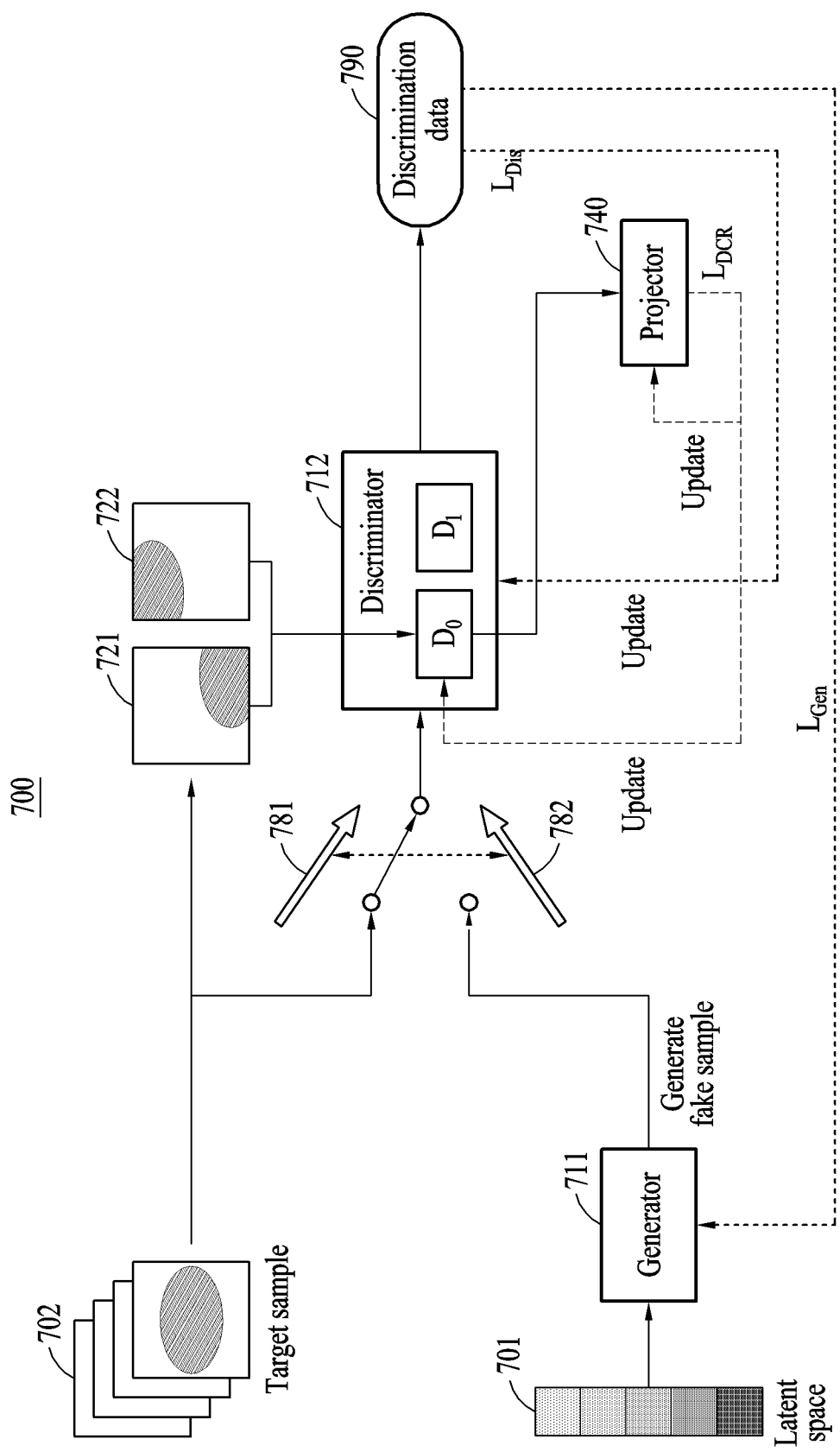
FIG. 7 illustrates an example of training a machine learning model, according to one or more embodiments.

FIGS. 6A, 6B and 7 illustrate examples of training of a machine learning model, according to one or more embodiments.

FIG. 6A illustrates a training of a GAN model for an image translation from a horse into a zebra.

A machine learning model 600 according to an example may be a GAN model that includes a generator model 611 and a discriminator model 612, and a projector model 640 for a calculation of DCR loss (LDCR). An electronic device may calculate discrimination loss ($L_{Dis}$) and generation loss ($L_{Gen}$) in addition to the DCR loss (LDCR) described above.

For example, the electronic device may calculate the DCR loss (LDCR) based on a training sample image (e.g., a target sample image 602). The electronic device may acquire a first image patch 621 and a second image patch 622, which may be crops of the target sample image 602 as described with reference to FIG. 3. The electronic device may respectively extract a first feature map and a second feature map from the first image patch 621 and the second image patch 622, based on a partial layer Do of the discriminator model 612. The electronic device may acquire a projected map by applying the projector model 640 to one of the first feature map and the second feature map. The electronic device may extract a first partial feature map and a second partial feature map with respect to an overlapping region that is common on the projected map and the other feature map. The electronic device may calculate the DCR loss (LDCR) according to Equation 1 described above by using the first partial feature map and the second partial feature map. The electronic device may update parameters of the discriminator model 612 and the projector model 640 by using the calculated DCR loss (LDCR).

Furthermore, the electronic device may calculate a second objective function value by using discrimination data 690 (e.g., source discrimination data and target discrimination data) on images for each domain (e.g., a source domain and a target domain). As described above, the discrimination data 690 may include discrimination probability values for each respective pixel of an image input to the discriminator model 612, and/or a discrimination probability value for an entire scene of the corresponding image. For example, the electronic device may calculate a second objective function value (e.g., the discrimination loss ($L_{Dis}$)), based on the target discrimination data and the source discrimination data, where the target discrimination data is calculated by using the discriminator model 612 from the training sample image, and the source discrimination data is calculated based on the discriminator model 612 from a fake image generated by using the generator model 612 of the machine learning model 600. The electronic device may input the target sample image 602 to the discriminator model 612 through a first path 681. The electronic device may input the fake image generated by the generator model 611 to the discriminator model 612 through a second path 682. The electronic device may calculate the discriminator loss (LDis) by utilizing the target discrimination data on the target sample image 602, and the source discrimination data on the fake image. The discrimination loss ($L_{Dis}$) may be calculated, as shown in Equation 3 below.

$$L_{Dis} = \max_{D} \mathbb{E}_{x \sim q_{data}(x)}[\log D(x)] + \mathbb{E}_{z \sim p(z)}[\log(1 - D(G(z)))] \quad \text{Equation 3}$$

In Equation 3, x represents the target sample image 602, and z represents the source sample image 601. G(z) represents the fake image generated by the generator model 611 from the source sample image 601. D(x) represents the target discrimination data on the target sample image 602, and D(G(z)) represents the source discrimination data on the fake image. $\mathbb{E}_{x \sim q_{data}(x)}[\log D(x)]$ represents an expected value for discriminating the target sample image 602 to be true, and $\mathbb{E}_{z \sim p(z)}[\log(1-D(G(z)))]$ represents an expected value for discriminating the fake image to be false. The discrimination loss ($L_{Dis}$) may be an objective function that is designed to maximize the two expected values described above. The electronic device may update a parameter of the discriminator model 612 by using the calculated discrimination loss ($L_{Dis}$).

The electronic device may train the generator model 611 through a third objective function value (e.g., generation loss ($L_{Gen}$)) based on the source discrimination data calculated by using the discriminator model 612 from the fake image generated by the generator model 611. For example, the electronic device may calculate the generation loss ($L_{Gen}$), as shown in Equation 4 below.

$$\mathbb{E}_{z \sim p(z)}[\log(1-D(G(z)))] \quad \text{Equation 4}$$

In Equation 4, $\mathbb{E}_{z \sim p(z)}[\log(1-D(G(z)))]$ represents an expected value for discriminating the fake image to be false, as described above. The generation loss ($L_{Gen}$) in Equation 4 is an objective function that is designed to minimize the expected value for discriminating the fake image to be false. In other words, the electronic device may be trained to generate the fake image to deceive the discriminator model 612 by updating a parameter of the generator model 611 by using the generation loss ($L_{Gen}$).

Although the training by each objective function value is individually described above, there is no limitation thereto. The electronic device may perform the training in parallel and/or a time series based on the first objective function value, the second objective function value, and the third objective function value described above. The electronic device may train the discriminator model 612 based on the sum of the first objective function value and the second objective function value.

FIG. 6B illustrates examples of generated images. In each example, a corresponding machine learning model has been trained to generate an image belonging to a target domain from a source image.

In Example 1, image translations from a source image of a dog into a target domain representing a leopard are depicted. In an image 611b generated in Comparative Example 1 (e.g., StarGANv2), a shape of the dog (relative to the source image) may be damaged, and the leopard may be generated. In contrast, in an image 612b generated by an implementation of example described herein (e.g., Star-GANv2+DCR), a texture of the leopard (e.g., stripes and whiskers) may be represented while maintaining the shape (e.g., the ear shape) of the dog in the source image.

In Example 2, image translations from a source image of a horse into a target domain representing a zebra are depicted. In an image 621b generated in Comparative Example 2 (e.g., CUT), a pattern of the zebra may not be represented sufficiently. In contrast, in an image 622b generated by an implementation of an example described herein (e.g., CUT+DCR), a texture of the zebra which is the target domain may be fully applied to a shape of the horse in the source image.

In other words, the discriminator model of the GAN model, to which the DCR according to an example is applied, may capture a feature of an image of the target domain, and the generator model may accurately learn a feature of the target domain efficiently. Furthermore, the DCR scheme according to an example may require a smaller number of training data sets and/or epochs, compared to comparative examples. An electronic device using the DCR scheme may train the discriminator model and the generator model by capturing a feature of data with a relatively small amount of data. More efficient learning performance may be provided in an online learning environment in which data collection is limited.

The machine learning model to which the training based on the DCR loss is additionally applied according to an example may represent a frechet inception distance (FID) score that is improved, compared to comparative examples (e.g., CycleGAN, StarGAN, CUT, Multimodal UNsupervised Image-to-image Translation (MUNIT), and fixed self-similarity (FSeSim) scheme). The improvement of the FID indicates that machine learning models trained based on the DCR scheme effectively capture unique characteristics of the domain.

FIG. 7 illustrates a machine learning model 700 applied to a process of manufacturing a product, according to one or more embodiments. An electronic device may respectively crop or select a first image patch 721 and a second image patch 722 from a target sample image 702 of a normal product. The electronic device may resize the first image patch 721 and the second image patch 722 to an input format of a discriminator model. The electronic device may extract a projected map by using a projector model 740 for a first feature map of the first image patch 721. The electronic device may calculate DCR loss (LDCR) by using portions corresponding to an overlapping region of a second feature map of the second image patch 722 and the projected map. The electronic device may calculate discrimination loss ($L_{Dis}$), as shown in Equation 3 above, and calculate generation loss ($L_{Gen}$) as shown in Equation 4 above. To calculate the discrimination loss ($L_{Dis}$) and generation loss ($L_{Gen}$), a discriminator model 712 may receive inputs of the target sample image 702 and/or a fake image through a first path 781 and/or a second path 782.

A generator model 711 according to an example may be trained to generate the fake image to be similar to the target sample image 702 from a latent vector 701 in a source latent space. The electronic device may sample the latent vector 701 arbitrarily (e.g., randomly according to a Gaussian distribution) in the source latent space. The electronic device may update a parameter of the generator model 711 (based on the generation loss ($L_{Gen}$)) to generate the fake image belonging to the target domain from the sampled latent vector. The source latent space may be a space in which latent variable values for abstracting an image (e.g., the image including a normal product in FIG. 7) in the target domain are positioned. That is, the source latent space may be interpreted as a space trained to represent a normal product sample.

As described with reference to FIGS. 1 through 7, the electronic device according to an example may perform an inference operation by using a trained machine learning model. For example, the electronic device may output a discrimination result for an input image (e.g., a product image), based on at least one of the discriminator model and the generator model as trained by using the discriminator model. The discrimination result may be a result indicating whether an object included in the input image that is input to the discriminator model is true or false (e.g., fake or not), and may be determined, for example, based on discrimination data. An operation of determining the discrimination result by using the discrimination data will be described with reference to FIGS. 8 and 9 below.

Figure 8:
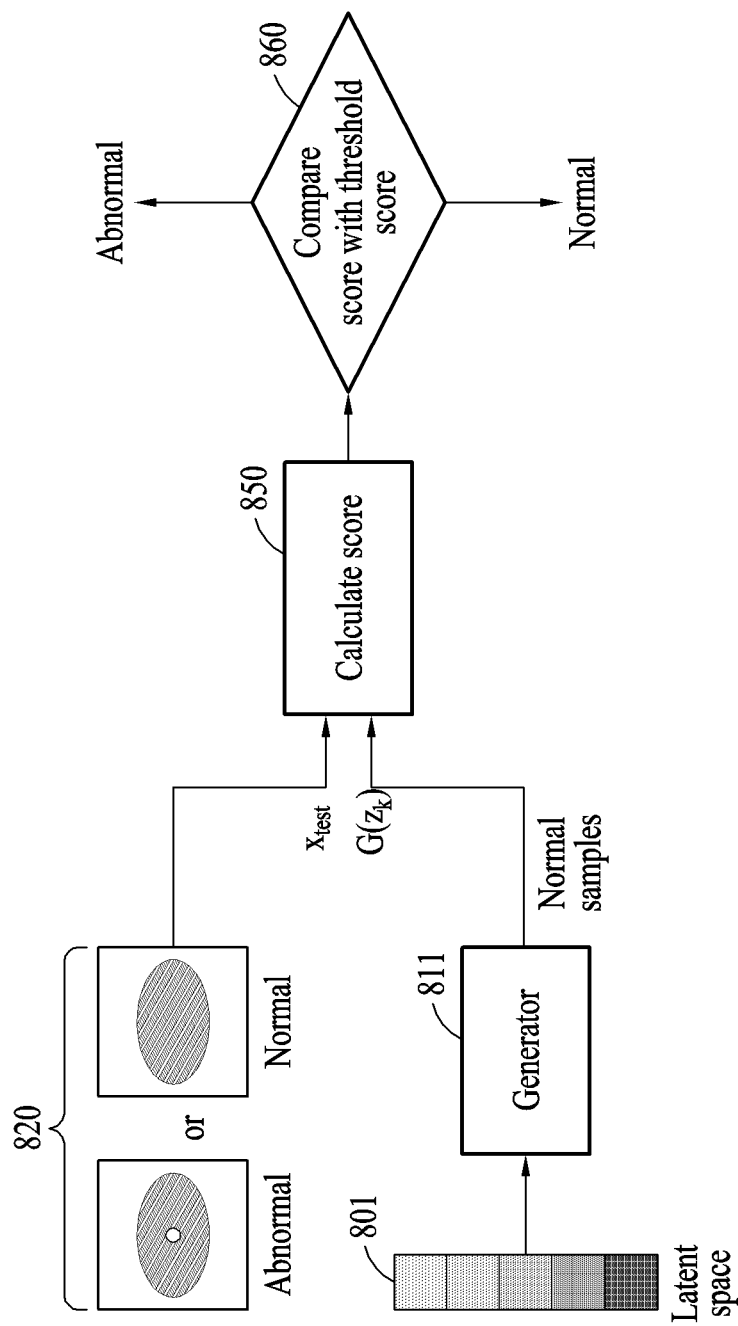
FIG. 8 illustrates an example of an inference using a generator, according to one or more embodiments.

FIG. 8 illustrates an example of an inference using a generator, according to one or more embodiments.

In operation 850, an electronic device according to an example may generate a score on a captured product image 820 (e.g., $x_{test}$), based on a generator model 811. The electronic device may acquire the product image 820 for a product manufactured in a process line, based on capturing by a vision sensor (e.g., a camera sensor) installed in the process line.

In operation 860, the electronic device may compare the score calculated in operation 850 with a threshold score. The electronic device may determine whether a product captured in the product image 820 is normal or abnormal based on a comparison result between the score calculated for the product image 820 and the threshold score. For reference, an abnormal product may be a product having a defect; a defect of an abnormal product is illustrated in FIG. 7 with a circle.

If the calculated score indicates sufficient similarity (e.g., exceeds the score threshold) between the product image 820 and an image (e.g., $G(z_k)$) generated by the generator model 811, the electronic device may determine that the corresponding product is normal. The electronic device may determine that the corresponding product is abnormal when the similarity is equal to or less than the threshold score. If the calculated score is a distance (e.g., a Euclidean distance, a difference in pixel values, and/or various metrics) between the product image 820 and an image generated by the generator model 811, the electronic device may determine that the corresponding product is normal when the calculated distance is equal to or less than the threshold score, and may determine that the corresponding product is abnormal when the calculated distance exceeds the threshold score. The distance between the product image 820 and the generated image may be calculated by Equation 5 below.

$$\text{Score} = \frac{1}{n}\sum_{k}^{n}|x_{test} - G(z_k)| \qquad \text{Equation 5}$$

The electronic device may sample n latent vectors from a source latent space 801. For example, n may be an integer of 1 or more. The electronic device may generate n generated images by applying the generator model 811 to each of the n latent vectors. The electronic device may calculate an average of distances between the product image 820 and the n generated images, as shown in Equation 5 above. The latent vectors may be sampled according to the Gaussian distribution, as described above.

Figure 9:
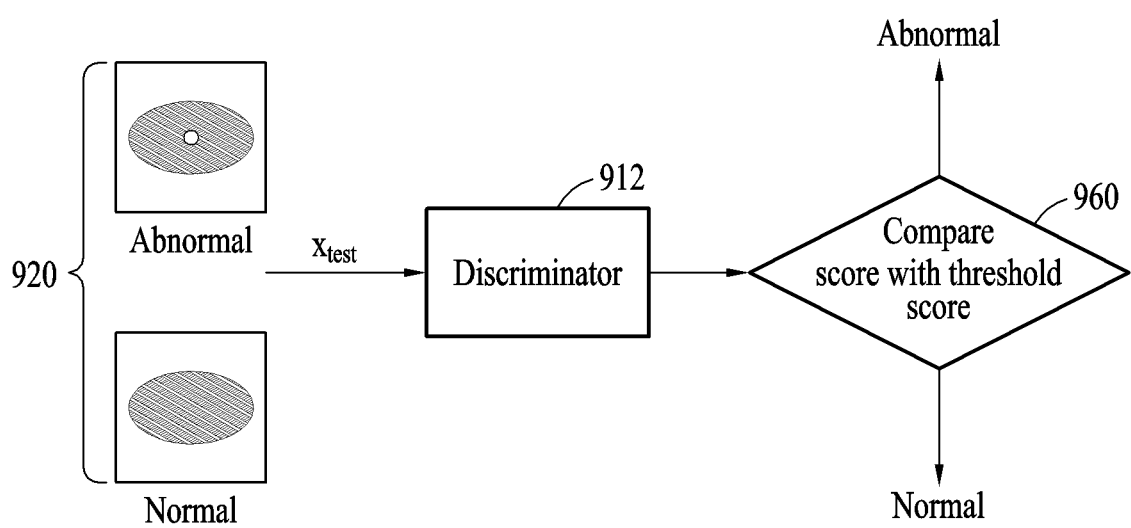
FIG. 9 illustrates an example of an inference using a discriminator, according to one or more embodiments.

FIG. 9 illustrates an example of an inference using a discriminator, according to one or more embodiments.

An electronic device according to an example may output a discrimination result by using a discriminator model. For example, the electronic device may acquire a product image 920 (e.g., $x_{test}$) through an image sensor installed in a process line. The electronic device may acquire discrimination data by inputting the product image 920 to a discriminator model 912. The discrimination data may have probability values for each respective pixel as described above, or have a single probability value representing a product itself included in the product image 920 to be true or false. For example, the electronic device may acquire the discrimination data having a discrimination probability value for each pixel from the discriminator model.

In operation 960, the electronic device may compare a score with a threshold score, and determine whether the product included in the product image 920 is normal or abnormal according to a comparison result. For example, the electronic device may calculate the score based on the discrimination data described above. If the discrimination data has probability values for each of the pixels, the score may be a statistical value (e.g., an average) of the discrimination probability values for each pixel. As another example, the electronic device may determine a discriminated region based on the discrimination probability values for each of the pixels. The discriminated region may be a region that is discriminated to correspond to an object which is true, and may be a region in which pixels having the discrimination probability value exceeding a threshold probability value are collected. However, there is no limitation thereto, and, for example, the discriminated region may be designed to be a region that is discriminated to be false. The electronic device may calculate the score by using one or more of an area, a size, and/or a ratio of the discriminated region described above. As another example, if the discrimination data has a discrimination probability value for an entire scene, the electronic device may determine the discrimination probability value itself for the entire scene as the score. For ease of description, in the present disclosure, an example in which the discrimination probability value represents a probability that the product is true, that is, a probability that the product is a normal product, is mainly described.

The electronic device may determine the discrimination result based on the discrimination probability value and/or the discriminated region that is discriminated based on the discrimination probability value in the discrimination data. For example, when the score calculated based on the statistical value of the discrimination probability value, the region discriminated to be true, and/or the discrimination probability value for the entire scene exceeds the threshold score, the electronic device may determine that the product in the product image is normal. In contrast, when the score is equal to or less than the threshold score, the electronic device may determine that the product in the product image is abnormal.

Figure 10:
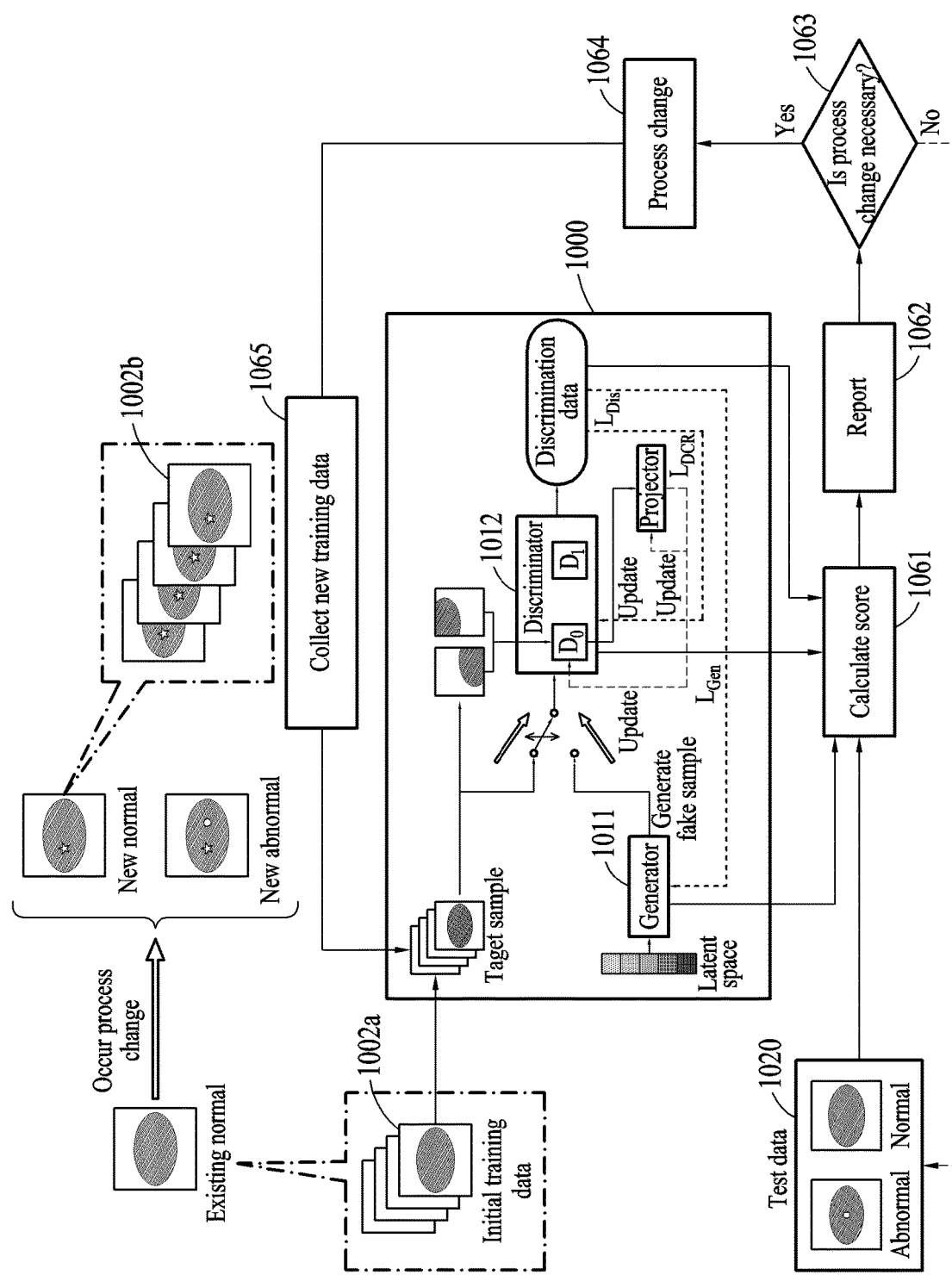
FIG. 10 illustrates retraining of a machine learning model, according to one or more embodiments.

FIG. 10 illustrates a re-training of a machine learning model according to one or more embodiments.

An electronic device according to an example may train a GAN model including a generator model 1011 and a discriminator model 1012 based on initial training data 1002a. The electronic device may perform an inference (e.g., a discrimination of a normal product) for a product image 1020 by using the trained GAN model.

For example, the electronic device may input a product image to a machine learning model, which output an indication, of whether a product included in the product image is normal or abnormal. The indication of the output may be based on the discriminator model 1012 and/or the generator model 1011 (as trained by using the discriminator model 1012). For example, in operation 1061, the electronic device may use the machine learning model to calculate a score on the product image. The electronic device may calculate the score based on the generator model 1011, as described with reference to FIG. 8, and based on the discriminator model 1012, as described with reference to FIG. 9. The electronic device may determine whether the product in the product image 1020 is a normal product or an abnormal product based on a result of comparing the score with a threshold score. The electronic device may present a discrimination result indicating whether the product image 1020 is normal or abnormal to a user (e.g., a process manager).

In operation 1062, a report may be provided by the user with respect to the discrimination result output by the electronic device. For example, the electronic device may receive the report from the user as to whether the discrimination result is correct. Alternatively, a report may be provided automatically based on a generated statistic of discrimination results.

In operation 1063, the electronic device may determine whether a process change is necessary (for producing the product). For example, the electronic device may determine that the process change is necessary when a defect rate (according to discrimination results) increases in a process line. As another example, the electronic device may determine that the process change is necessary when an input demanding the process change is received from the user. As another example, the electronic device may determine that the process change is necessary when errors between the discrimination result and whether the product is normal as confirmed by the user accumulate as a result reported by the user. However, the determination whether the process change is necessary is not limited thereto, and the process change may be demanded by various factors. In operation 1064, the electronic device may perform the process change when the process change is necessary. For reference, in FIG. 10, although a portion in a new product according to the process change that varies from a portion in an existing product is illustrated with a star, a shape or a position of the defect is not limited thereto.

In operation 1065, the electronic device may collect new training data, for example data captured after a product production process has changed. For example, the electronic device may collect a normal product image 1002b in which a normal product in the changed process is captured. Based on a demand for an update of a discriminator model, the electronic device may extract new image patches at least partially overlapping each other from each image (e.g., an image for a normal product in a new process) of a newly collected training data set. The electronic device may update a parameter of the discriminator model by using an objective function value calculated based on the extracted new image patches.

Figure 11:
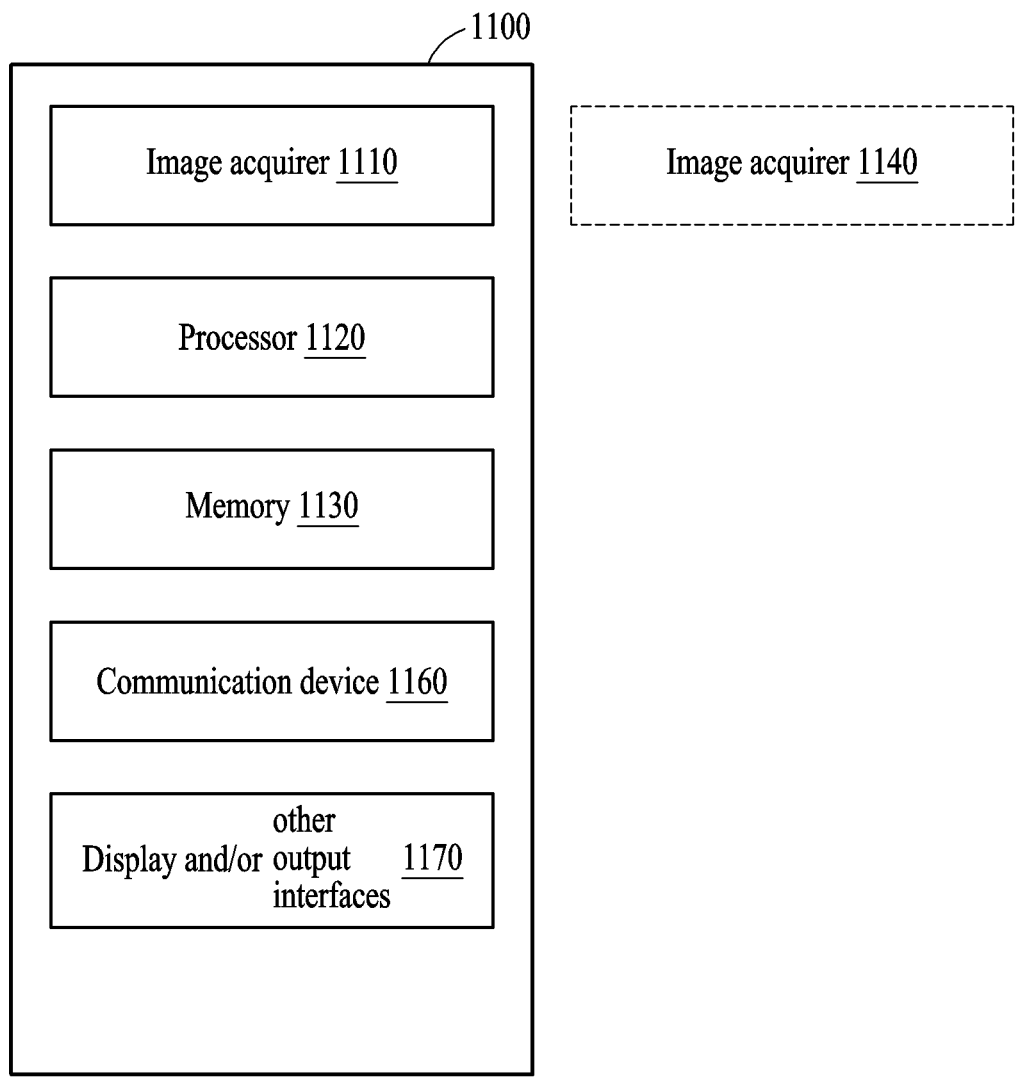
FIG. 11 illustrates an example of a configuration of an electronic device, according to one or more embodiments.

FIG. 11 is a block diagram illustrating an example of a configuration of an electronic device, according to one or more embodiments.

An electronic device 1100 according to an example may perform a target task by using the machine learning model described above, or may perform training of the machine learning model based on the DCR described above. The electronic device 1100 may train each model online and/or offline by the method described with reference to FIGS. 1 through 10.

The electronic device 1100 is a device that performs a vision-based discrimination, and may be, for example, an image editor, a mobile terminal, a smartphone, a foldable smartphone, a tablet computer, a netbook, a laptop, a desktop, a personal digital assistant (PDA), a biometric door lock, a security device, a financial transaction device, a vehicle starting device, an autonomous driving vehicle, a robot cleaner, a drone, a product process monitoring system, or the like. However, an example of the electronic device 1100 is not limited thereto.

The electronic device 1100 according to an example may include an image acquirer 1110, a processor 1120, and a memory 1130.

The image acquirer 1110 may acquire an image (e.g., a product image) of an object to be discriminated. For example, the image acquirer 1110 is a vision sensor, and may be or include a camera sensor, an infrared sensor, or the like. The vision sensor may visually capture an image of a discrimination object. However, there is no limitation thereto, and the electronic device 1100 may include a communication device 1160 that receives an image from an external image acquirer 1140 (e.g., image sensor) spaced apart from the electronic device 1100. The electronic device 1100 may further include a display 1170 and/or other output interfaces which may be used to display any of the items generated by embodiments described above, for example, images generated by an image generator, outputs indicating discrimination results, etc.

The processor 1120 may extract, from a training sample image, a first image patch and a second image patch at least partially overlapping with the first image patch. The processor 1120 may extract a first feature map from the first image patch, based on a partial layer of a discriminator model, and extract a second feature map from the second image patch, based on the partial layer. The processor 1120 may extract, from the extracted first feature map, a first partial feature map corresponding to a part of a projected map, based on a projector model. The processor 1120 may train the discriminator model based on a first objective function value calculated based on a second partial feature map and the first partial feature map, where the second partial feature map corresponds to a part of the extracted second feature map. However, an operation of the processor 1120 is not limited thereto, and the processor 1120 may perform at least one of the operations described with reference to FIGS. 1 through 10 at the same time or in parallel.

The memory 1130 may store a machine learning model including the discriminator model. The memory 1130 may further store a generator model, connected with an input of the discriminator model in the machine learning model, and the projector model.

The electronic device 1110 according to an example may be applied to various applications utilizing a GAN model. The electronic device 1100 may perform an effective training with a small amount of data when a circumstance (and data indicative thereof) changes in a production line, for example. Also, the electronic device 1100 may train an unsupervised learning model without a label, based on a DCR. The machine learning model trained based on the DCR as described above may output a result in which a semantic and a visual consistency is maintained in a spatial aspect of the image.

The computing apparatuses, the vehicles, the electronic devices, the processors, the memories, the image sensors, the vehicle/operation function hardware, the ADAS/AD systems, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:
   a memory storing a machine learning model including a discriminator model; and
   a processor configured to:
   extract, from a training image, a first image patch and a second image patch at least partially overlapping the first image patch;
   extract, from the first image patch, a first feature map based on a layer of the discriminator model;
   extract, from the second image patch, a second feature map based on the layer;
   extract a first partial feature map from a projected map that is projected based on the first feature map; and
   train the discriminator model based on a first objective function value generated based on a second partial feature map and the first partial feature map, wherein the second partial feature map corresponds to a part of the extracted second feature map.

2. The electronic device of claim 1, wherein the processor is further configured to:
   determine, to be the first partial feature map, a portion of the projected map corresponding to an overlapping region between the first image patch and the second image patch; and
   determine, to be the second partial feature map, a portion of the second feature map corresponding to the overlapping region.

3. The electronic device of claim 1, wherein the processor is further configured to update a parameter of the layer, or another layer, of the discriminator model, and update a parameter of the projector model, based on the first objective function value.

4. The electronic device of claim 1, wherein the memory is configured to further store a generator model connected with an input of the discriminator model in the machine learning model, and
   wherein the processor is further configured to calculate a second objective function value based on target discrimination data and source discrimination data, wherein the target discrimination data is calculated by using the discriminator model from the training sample image, and wherein the source discrimination data is calculated based on the discriminator model from a fake image generated by using the generator model.

5. The electronic device of claim 4, wherein the processor is further configured to train the generator model through a third objective function value based on the source discrimination data calculated based on the discriminator model from the fake image generated by using the generator model.

6. The electronic device of claim 1, wherein the processor is further configured to output a discrimination result for an input image, based on at least one of the discriminator model and a generator model trained by using the discriminator model.

7. The electronic device of claim 6, wherein the processor is further configured to:
   generate, from the discriminator model, discrimination data having a discrimination probability value for each pixel of the input image; and
   determine the discrimination result based on the discrimination probability value or a region discriminated based on the discrimination probability value in the discrimination data.

8. The electronic device of claim 6, wherein the processor is further configured to output, from a product image input to the machine learning model, an indication of whether a product represented in the product image is normal or abnormal, based on the discriminator model or the generator model trained by using the discriminator model.

9. The electronic device of claim 1, wherein the processor is further configured to output a feature map on which a value of a portion to be discriminated is higher than a value of a remaining portion, from the layer of the discriminator model.

10. The electronic device of claim 1, wherein the processor is further configured to:
    extract new image patches partially overlapping with each other from respective images of a training data set, based on a demand for an update of the discriminator model; and
    update a parameter of the discriminator model by using an objective function value calculated based on the extracted new image patches.

11. The electronic device of claim 1, wherein the first feature map is generated by the layer of the discriminator model, and wherein the second feature map is generated by the layer.

12. The electronic device of claim 11, wherein the layer is a convolution layer comprising weights.

13. The electronic device of claim 1, wherein the projected map is generated by a projection model based on the first feature map.

14. A training method performed by an electronic device, the method comprising:
   extracting, from an image, a first image patch and a second image patch at least partially overlapping the first image patch;
   extracting, from the first image patch, a first feature map based on a layer of a discriminator model of a machine learning model;
   extracting, from the second image patch, a second feature map based on the layer;
   extracting, from the first feature map, a first partial feature map corresponding to a part of a projected map projected from first partial feature map; and
   training the discriminator model based on a first objective function value calculated based on a second partial feature map and the first partial feature map, wherein the second partial feature map corresponds to a part of the second feature map.

15. The method of claim 14, wherein the extracting of the first partial feature map comprises determining, to be the first partial feature map, a portion of the projected map corresponding to an overlapping region between the first image patch and the second image patch, and
   wherein the training of the discriminator model comprises determining a portion corresponding to the overlapping region on the extracted second feature map, to be the second partial feature map.

16. The method of claim 14, wherein the training of the discriminator model comprises updating a parameter of at least the layer, or another layer, of the discriminator model and a parameter of the projector model, based on the first objective function value.

17. The method of claim 14, wherein the training of the discriminator model comprises calculating a second objective function value based on target discrimination data and source discrimination data, wherein the target discrimination data is calculated by using the discriminator model from the image, and the source discrimination data is calculated based on the discriminator model from a fake image generated by a generator model in the machine learning model.

18. The method of claim 17, further comprising:
   training the generator model through a third objective function value based on the source discrimination data calculated based on the discriminator model from the fake image generated by using the generator model.

19. The method of claim 14, further comprising:
   outputting a discrimination result for an input image based on the discriminator model or a generator model trained by the discriminator model.

20. The method of claim 19, wherein the outputting the discrimination result comprises:
   generating, from the discriminator model, discrimination data having a discrimination probability value for each pixel of the image; and
   determining the discrimination result based on the discrimination probability value and a region discriminated based on the discrimination probability value in the discrimination data.

21. The method of claim 19, wherein the outputting of the discrimination result comprises outputting, from a product image input to the machine learning model, whether a product comprised in the product image is normal or abnormal, based on the discriminator model or a generator model trained by using the discriminator model.

22. The method of claim 14, further comprising:
   outputting a feature map on which a value of a portion to be discriminated is higher than a value of a remaining portion, in the layer of the discriminator model.

23. A non-transitory computer-readable storage medium storing instructions that, when executed by a processor, cause the processor to perform the method of claim 14.

* * * * *